(12) United States Patent
Jeuk et al.

(10) Patent No.: US 11,575,580 B2
(45) Date of Patent: Feb. 7, 2023

(54) MULTI-DOMAIN AND MULTI-TENANT NETWORK TOPOLOGY MODEL GENERATION AND DEPLOYMENT

(71) Applicant: Cisco Technology, Inc., San Jose, CA (US)

(72) Inventors: Sebastian Jeuk, Munich (DE); Sridar Kandaswamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/335,798

(22) Filed: Jun. 1, 2021

(65) Prior Publication Data

US 2022/0385538 A1 Dec. 1, 2022

(51) Int. Cl.
*H04L 41/12* (2022.01)
*H04L 67/1001* (2022.01)

(52) U.S. Cl.
CPC .......... *H04L 41/12* (2013.01); *H04L 67/1001* (2022.05)

(58) Field of Classification Search
CPC . G06F 30/3323; H04L 41/0823; H04L 41/12; H04L 41/145
See application file for complete search history.

(56) References Cited

U.S. PATENT DOCUMENTS

| | | | | |
|---|---|---|---|---|
| 9,276,816 B1 * | 3/2016 | Conte | ..................... | H04L 41/12 |
| 9,602,387 B2 * | 3/2017 | Wood | ...................... | H04L 45/16 |
| 9,900,221 B2 * | 2/2018 | Hiscock | .................. | H04L 41/12 |
| 10,992,540 B1 * | 4/2021 | Kandaswamy | ..... | H04L 41/0823 |
| 2013/0290855 A1 * | 10/2013 | Ashcraft | ............... | G06F 3/0486 |
| | | | | 715/738 |
| 2014/0068075 A1 | 3/2014 | Bonilla et al. | | |
| 2015/0309780 A1 | 10/2015 | Ruehl et al. | | |
| 2016/0043968 A1 | 2/2016 | Jacob et al. | | |
| 2019/0123973 A1 | 4/2019 | Jeuk et al. | | |
| 2020/0084112 A1 * | 3/2020 | Kandaswamy | ......... | H04L 41/12 |
| 2021/0392049 A1 * | 12/2021 | Jeuk | ........................ | H04L 47/74 |
| 2021/0409277 A1 * | 12/2021 | Jeuk | ........................ | H04L 41/14 |

* cited by examiner

*Primary Examiner* — Chris Parry
*Assistant Examiner* — Dixon F Dabipi
(74) *Attorney, Agent, or Firm* — Lee & Hayes, P.C.

(57) ABSTRACT

Techniques are described herein for generating network topologies based on models, and deploying the network topologies across hybrid clouds and other computing environments that include multiple workload resource domains. A topology deployment system may receive data representing a logical topology model, and may generate a network topology for deployment based on the logical model. The network topology may include various services and/or other resources provided by different tenants in the computing environment, and tenant may be associated with different set of resources and deployment constraints. The topology deployment system may determine and generate the network topology to use the various resources and comply with various deployment constraints of the different tenants providing the services, and the tenants consuming the network topology.

20 Claims, 7 Drawing Sheets

MULTI-DOMAIN AND MULTI-TENANT NETWORK TOPOLOGY MODEL GENERATION AND DEPLOYMENT

TECHNICAL FIELD

The present disclosure relates generally to generating and deploying computing and/or network topologies across multiple workload resource domains. In particular, the present disclosure relates to generating network topologies based on a combination of services and/or resources provided by different tenants within a computing environment, in which the different tenants may have different associated sets of resources and deployment constraints.

BACKGROUND

Cloud computing involves using a network of servers hosted remotely on the Internet, rather than local servers or personal computers, to store, manage, and process data. Cloud computing networks for large-scale systems commonly may use deployment models, in which private clouds and/or on-premise infrastructures may be allocated for storing or processing private and secure data, while one or more public clouds may be used for storing or process other non-secure system data. Such computing environments, which may be referred to as multiple workload resource domain environments (or multi-pool environments) may include multi-cloud environments, hybrid cloud environments, multi-datacenter environments, multi-edge computing environments, and/or any combination thereof. Multiple workload resource domain environments may allow architectural flexibility and scalability with respect to processing demand, as well as allowing integration of specialized computational models.

When designing network topologies for deployment within a public cloud, private cloud, on-premise datacenter, or the like, a network topology model is generated based on a logical model and/or constraints provided by system administrators and/or tenants. However, for network topologies spanning multiple workload resource domain environments, generation, deployment, and maintenance of the topology may be complex and costly, due to the potential functional disparities between the different computing environments, dynamic system changes or errors that may occur within the computing environments after deployment of the topology, and splitting of system management responsibilities between the public cloud providers, private cloud providers, on-premise infrastructure administrators, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
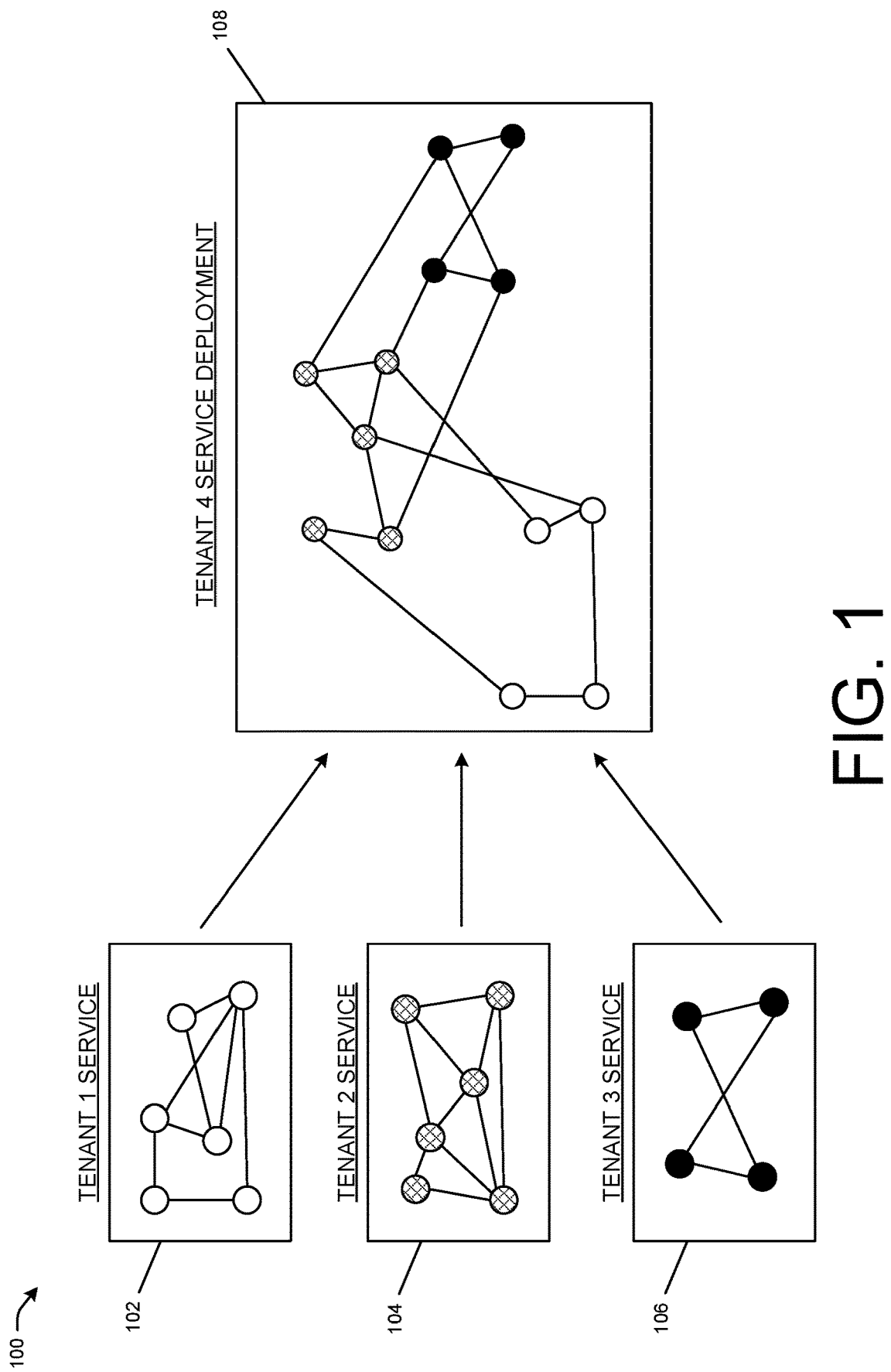
FIG. 1 depicts an example network topology for a service deployment associated with a tenant, based on additional services provided by other tenants in a computing environment.

This disclosure describes techniques for generating and deploying network topologies within hybrid clouds and other computing environments that include multiple workload resource domains. In various examples describe herein, a topology deployment system may receive data representing a logical topology model, and may generate a network topology for deployment based on the logical model. The network topology may include various services and/or other resources provided by different tenants in the computing environment, and tenant may be associated with different set of resources and deployment constraints. The topology deployment system may determine and generate the network topology to use the various resources and comply with various deployment constraints of the different tenants providing the services, and the tenants consuming the network topology.

In some examples, a topology deployment system may receive requests for deployments to be generated within a cloud computing environment, based on a logical (or intent-based) topology model. The topology deployment system may determine a network topology that is functionally equivalent to the logical model, using resources (e.g., services) provided by multiple different service providers (e.g., tenants) within the cloud computing environment. For example, different tenants may use different underlying sets of computing resources to provide different services within the cloud computing environment. Additionally, each tenant and/or each service provided by a tenant may have an associated set of deployment constraints. For example, deployment constraints associated with a tenant and/or service may specify requirements that the service is to be deployed on a specific workload resource domains (e.g., cloud or on-premise infrastructure), a requirements relating to the types of resources used, security requirements, network requirements, affinity rules (or anti-affinity rules), and the like.

When determining the functionally equivalent network topology, the topology deployment system may select resources (e.g., services) provided by a combination of tenants, and may verify compliance with the tenant-specific deployment constraints. As an example, if a first service provided by a first tenant includes an associated deployment constraint that conflicts with a deployment constraint of a second service provided by a second tenant, the topology deployment system may determine that the services cannot be included together in the deployed network topology. In this example, the topology deployment system may determine a different combination of services/tenants having compatible sets of resources and deployment constraints, to generate and deploy the network topology.

Further, in some cases additional resource inventory requirements and/or deployment constraints may be associated with the request for the network topology. For example, a first tenant within a cloud computing environment may generate a service to provide based on a composite of underlying services provided by other tenants. In this example, both the first tenant consuming the underlying services and the tenants providing the underlying services may have different and unique sets of deployment constraints. The topology deployment system may generate the network topology based on the deployment constraints of the various service provider tenants (and/or services) and the additional deployment constraints of the tenant consuming the underlying services to provide the composite service. An identification scheme may be used to provide fine-grained differentiation between services, workload resource domains, and the tenants using the services. Cloud-based resources and/or deployment constraints are defined and associated with cloud identifiers and/or metadata.

The techniques described herein may provide various technical advantages and improvements, including at least improvements in generating network topologies for deployment within workload resource domains, by supporting differentiation in resources used and deployment constraints between individual tenants, clouds, and/or services within a computing environment, as well as determining/optimizing network topologies that comply with different combinations of deployment constraints associated with tenants providing and/or consuming services within the computing environment.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout. The techniques described herein may be performed as methods, or by computing devices and/or system having processors and memory units, or may be embodied in non-transitory computer-readable medium storing processor-executable instructions that, when executed by one or more processors, performs the techniques described.

EXAMPLE EMBODIMENTS

As noted above, this disclosure describes techniques for generating and deploying network topologies across multiple workload resource domains, using resource inventories and/or deployment constraints associated with specific tenants and services. As used herein, network topologies may refer to distributed computing systems in which a number of different resources (or nodes) are individually designed and/or configured to perform particular functionality, and the various nodes may coordinate and communicate with other nodes to provide the overall functionality of the network topology. The various nodes within a network topology may include, for example, nodes that are specialized and dedicated as network nodes, computing nodes, storage nodes, operating systems, software applications and services, and/or virtual computing machines or instances, etc. Different types and configurations of nodes may include specialized hardware and/or software components to perform the node functionality. Network nodes, for example, may include computing devices such as routers, servers, switches, load balancers, wireless access points, etc., running various software versions and/or having other attributes. Storage nodes may include various types of dedicated storage systems, compute nodes may include physical servers or other dedicated processing devices, and so on. Thus, network topologies may be used to implement enterprise systems and other large-scale computer systems.

In some embodiments, a network topology may be distributed across multiple different workload resource domains. A workload resource domain (which also may be referred to as a resource pool) may refer to any computing environment and/or computing resource container, such as public cloud computing environments, private cloud computing environments, or on-premise datacenters. Network topologies deployed across multiple workload resource domains (which also may be referred to as multi-pool network topologies) may include hybrid network topologies, multi-cloud network topologies, multi-datacenter network topologies, multi-edge network topologies, and any combination thereof in which the topology uses one or more nodes distributed across multiple different workload resource domains. Such multi-pool network topologies may provide potential advantages when designing and deploying large-scale computing systems. For example, certain network topologies may use deployment models in which private clouds and/or on-premise infrastructures are allocated to store and process private and secure data, while one or more public clouds may be used to store or process other non-secure system data. Multi-pool network topologies also may allow for architectural flexibility and scalability with respect to changes in processing demand over time, as well as allowing integration of specialized computational models.

In some examples, a network topology may be generated based on an underlying logical model, along with deployment constraints and/or resource inventory data. The logical (or intent-based) topology model initially may be created and validated, and then used for the physical realization (or deployment) of a network topology that is functionally equivalent to the logical model. During deployment within the multi-pool (e.g., multiple workload resource domain) environment, the network topology model may be optimized for performance and resource usage, and verified for functional equivalence with the logical model. The physical deployment of the network topology model may use internetworking devices and virtual processing resources. Formal methods may be used to validate the correctness of the logical model without the need for test-based verification, and deployment generation instructions may be used automatically generate a physical network topology for the deployment within the multi-pool network topology, including a set of deployment instructions that may be transmitted between gateways in different workload resource domains.

FIG. 1 shows an example network topology corresponding to a composite service generated and deployed by a tenant within a multi-pool environment, based on three underlying services provided by three other tenants within the environment. In this example, services 102, 104, and 106 may represent services each deployed as a network topology to provide particular functionality within the multi-pool environment. In some cases, service 102 may represent a web service deployed an operated by a first tenant (Tenant 1), service 104 may represent an application service deployed an operated by a second tenant (Tenant 2), and service 106 may represent a database service deployed an operated by a third tenant (Tenant 3). Each of the services 102-106 includes a separate network topology, which are depicted in FIG. 1 as a number of separate nodes representing resources connected by lines representing communication paths between the resources.

The composite service 108 in this example is a network topology generated based on a combination of the three underlying services 102-106. Additionally, the composite service 108 corresponds to a separate service generated and deployed by a separate tenant (Tenant 4) that uses a selected subset of resources from the underlying services 102-106 to provide the functionality of the composite service 108. It should be understood from the context of these disclosure that services 102-106 and the composite service 108 are non-limiting examples for illustrative purposes. In other examples, any numbers of tenants (or other service providers) may provide deploy and operate services (or other cloud-based resources) within the multi-pool environment. Additionally, in various instances any combination of different resources from the various different services may be used in a composite service that may be deployed by one of the same tenants or be a different tenant of the multi-pool environment. Further, although a multi-pool computing environment is not depicted in FIG. 1, it can be understood that any or all of the services 102-106, and/or the composite service 108, may include nodes/resources within a single workload resource domain or distributed across multiple workload resource domains within the computing environment.

As noted above, the techniques described herein relate to generating and deploying network topologies, including but not limited to the network topologies used to implement services 102-106 and the composite service 108. To generate a composite service 108 or another network topology, a topology deployment system may receive a request to generate/deploy the network topology including a logical model and/or metadata provided by a user (e.g., a tenant user, administrator user, cloud service provider user, etc.). In some instances, the topology deployment system may determine the number and configuration of nodes (e.g., services or resources) to be used in the deployed network topology. Additionally, each of the services 102-106 and the composite service 108 may be associated with different sets of computing resources and/or different sets of deployment constraints. In this example, Tenants 1-3 each may have one or more unique sets of deployment constraints associated with some or all of its respective services. When generating the composite service 108, the the topology deployment system may retrieve and analyze the deployment constraints associated with each of the Tenants 1-3, and may generate/deploy the composite service 108 so that it complies with the deployment constraints of Tenants 1-3. Additionally, Tenant 4 associated with the composite service 108 may have deployment constraints in addition to those of Tenants 1-3. Therefore, the topology deployment system also may generate the composite service 108 in such a manner so as to verify that the network topology also complies with the deployment constraints of the Tenant 4.

In the various examples and embodiments described herein, multi-pool network topologies may include any number of nodes, and different types of nodes (e.g., compute nodes, networking nodes, storage nodes, software and virtual machine nodes, etc.), which may be deployed across various workload resource domains such as public or private clouds, on-premise data centers, etc.

Figure 2:
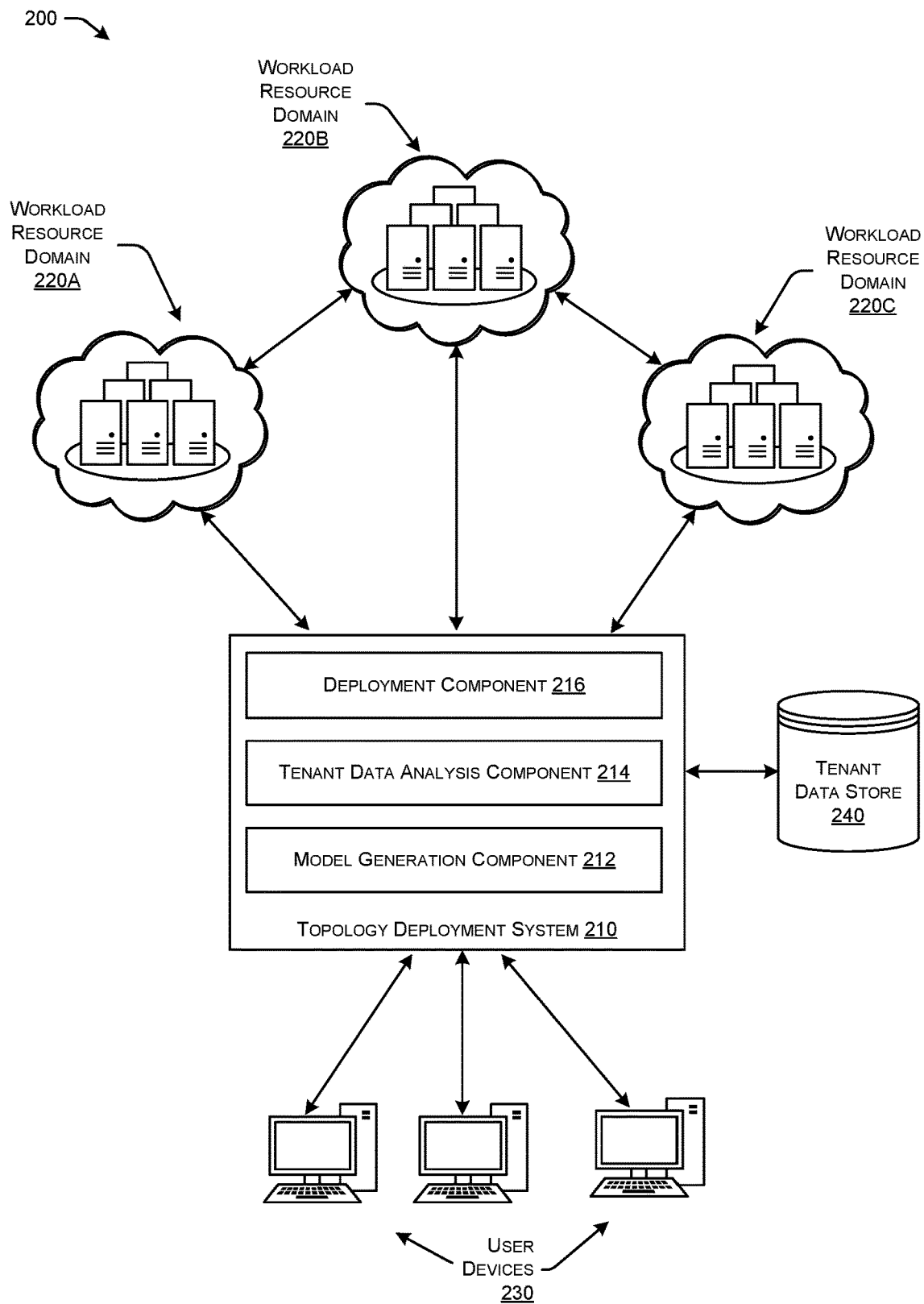
FIG. 2 depicts a computing environment including multiple workload resource domains and a topology deployment system configured to generate and deploy network topologies.

FIG. 2 illustrates a computing environment 200 including a topology deployment system 210, multiple workload resource domains 220, and one or more user devices 230. As described in more detail below, the topology deployment system 210 may be configured to generate and deploy network topologies within the computing environment 200.

As noted above, multi-pool network topologies may refer to large-scale computing systems and/or solutions that are implemented by several different nodes of various different types (e.g., network nodes, storage nodes, compute nodes, software application or service nodes, virtual machines or instances, etc.), which can be deployed across multiple different workload resource domains, and which can interact and communicate to provide the functionality of the overall topology. Workload resource domains 220 may refer to a dedicated pool of computer resources from which nodes may be allocated. By way of example only, workload resource domain 220A may correspond to a first public cloud computing environment, workload resource domain 220B may correspond to a second public cloud computing environment or to a separate private cloud computing environment, and workload resource domain 220C may correspond to another public or private cloud computing environment or to an on-premise datacenter. Although only three workload resource domains 220 are shown in this example, it is contemplated that a network topology may be deployed across any number of different public clouds, public clouds, private clouds, on-premise datacenters, and/or other resource pools, in various examples.

In various examples, each of the workload resource domains 220 (which also may be referred to as domain infrastructures) of the multi-domain computing environment 200 may generally represent or comprise a resource pool. The resource pool of each workload resource domain 220 may comprise a data center, multiple data centers within the same enterprise, multiple data centers across enterprises, etc. As a specific example, a campus network of a school may be a type of workload resource domain 220A that is connected to a data center running in another workload resource domain 220B by a connection through one or more networks, such as the Internet. Both of the workload resource domains 220A and 220B may further be connected to a public cloud provider 220C as a third domain infrastructure. This is one example of the types of workload resource domain 220 that may be interconnected to create a multi-domain environment 200. Generally, a workload resource domain 220 may comprise a set of resources that are managed, operated, and/or owned by the same or by different entities. In one specific example, the multi-domain environment 200 may comprise a multi-cloud environment that includes multiple public clouds, multiple private clouds (e.g., enterprise networks), a public cloud in combination with a private cloud/network, etc. However, the multi-domain environment 200 may also be utilized in other technologies. For instance, the multi-domain environment 200 may comprise domains of different devices in an Internet-of-Things (IoT) environments where each domain is a different grouping of IoT devices, and the domains are interconnected to form the multi-domain environment. 200. Generally, the multi-domain environment 200 may comprise groupings of devices in different technology areas and/or different types of devices assigned to multiple domains that are connected to each other.

In some examples, the topology deployment system 210 may be coupled directly or indirectly to a multi-pool network (e.g., a multi-cloud network) that may include the Internet, one or more private clouds, public clouds, and/or other resource pools (e.g., on-premise datacenters). The topology deployment system 210 may include components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

The different nodes types that may operate within a multi-pool network topology (e.g., network nodes, compute nodes, storage nodes, software application or service nodes, virtual machine instance nodes, etc.) each may correspond to or may be executed on one or more computers. As used herein, a "computer" may refer to one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special purpose computing devices.

In some examples, the topology deployment system 210 may include one or more of a model generation component 212, a tenant data analysis component 214, and/or a deployment component 216. As described below in more detail, the model generation component 212 may determine topology models for network topologies, based on various inputs such as a logical (or intent-based) topology input, resource inventories of the workload resource domains 220, and/or resource constraints provided by a user (e.g., system administrator or tenant user). The tenant data analysis component 214 may retrieve deployment constraints, resources, and metadata, to verify that a generated network topology complies with the applicable deployment constraints, resources, and metadata. As described below in more detail, a tenant data store 240 may be implemented to store and maintain tenant-specific, service-specific and/or cloud-specific data, including deployment constraints, computing resource requirements, and/or metadata such as service level agreements (SLAs) applicable to the particular tenant, service, or cloud. Although the tenant data store 240 is depicted as a remote database system in this example, in other examples the tenant data store 240 may be integrated within topology deployment system 210. In some cases, the tenant data store 240 may use specialized data structures and/or data formats to store the tenant data, such as 128-bit UCC identifiers (e.g., IPv6 format) to identify a workload resource domain 220, a service running within a workload resource domain 220, and a tenant.

The model generation component 212 and/or the tenant data analysis component 214 may provide the verified topology model to the deployment component 216 for physical deployment within the workload resource domains 220. The deployment component 216 may include various subcomponents configured to verify and optimize a network topology based on the model, and to generate deployment instructions programmed or configured to generate the network topology within the workload resource domains 220. The components of the topology deployment system 210 may be configured to assure that the network topology maintains functional equivalence with the logical model, and also can provide improvements in resource usage optimization and performance for the deployment.

Although not shown in FIG. 2 so as not to obscure the elements depicted therein, the computing environment 200 (which also may be referred to as a multi-pool network or environment) may include any combination of data communication networks through which the topology deployment system 210, workload resource domain(s) 220, and user devices 230 may communicate. The communication networks may include local area networks, wide area networks, internetworks or internets, using any of wireline or wireless links, including terrestrial or satellite links. The networks may be implemented by any medium or mechanism that provides for the exchange of data between the various elements of FIG. 2. The various elements of FIG. 2 may also have direct (wired or wireless) communications links. The workload resource domains 220 (e.g., private cloud network(s), public cloud network(s), on-premise datacenter(s), etc.), topology deployment system 210, and other elements of the computing environment 200 each can include a compatible interface and can be programmed or configured to use standardized protocols for communication across the networks, such as TCP/IP, Bluetooth, and higher-layer protocols such as HTTP, TLS, and the like.

Each workload resource domain 220 may be implemented using a server-class computer or other computers having one or more processor cores, co-processors, or other computers. Workload resource domains 220 may include physical server computers and/or a virtual server instances stored in a datacenter, such as through cloud computing. Additionally or alternatively, workload resource domains 220 such as public and/or private cloud networks, may comprise one or more applications executing on a server computer system which comprises instructions for application modeling and appliance/hardware mapping. Workload resource domains 220 may further comprise one or more network policies using notions such as templates or profiles that can be applied to different points in the computing environment 100.

In some embodiments, the topology deployment system 210 may be distributed across one or more of the workload resource domains 220, which may be bridged by a cloud service configured to integrate and virtualize various hierarchical layers of different public or private cloud networks, on-premise datacenters, etc. The individual workload resource domains 220 may comprise respective gateways (e.g., cloud gateways) that may translate cloud storage Application Programming Interfaces (APIs) to block-based storage protocols by using standard network protocols which integrate with existing applications within computing environment 200.

To deploy a network topology across multiple workload resource domains 220, the topology deployment system 210 may receive logical model input describing a prospective network topology and/or one or more predefined constraints to be placed on the formal/physical model. In some embodiments, the logical model input and/or the constraints may be received from a tenant user or system administrator via a user device 230. The topology deployment system 210 then may generate a network topology (e.g., a formal and/or physical network topology) for deployment in the multi-pool environment, including transmitting different sets of deployment instructions from the deployment component 216 to the respective gateways within the workload resource domains 220. In some embodiments, the formal (or physical) network topology determined within the model generation component 212 may be subjected to formal model checking to determine whether it is functionally equivalent to the logical model input. Upon establishing functional equivalence between the logical model input and the physical topology that was generated, the deployment instructions may be considered verified, and an actual realization of the generated hybrid network topology may be initiated.

In some embodiments, the input received from the user device 230, describing a network topology for generation or modification, may include multiple workload resource domains 220, including at least one public cloud network associated with a public cloud network provider, and at least one private cloud network associated with an enterprise. The enterprise may include programs, service models, and applications which reside in an on-premise datacenter of the enterprise. Such programs, service models, and applications may include software-as-a-service (SaaS) programs, platform-as-a-service (PaaS) programs, infrastructure-as-a-service (IaaS) programs, Load Balancing-as-a-service (LBaaS) programs, application frontends, application backends, application classification programs, firewalls or others.

A partial order reduction model checking also may be used by the model generation component 212 for model verification in some embodiments. In some examples, the constraint inputs received from network tenants, administrators, etc., via user devices 230 may specify one or more deployment constraints (or constraints) upon the realization of the logical topology within individual clouds and/or datacenters of the multi-pool environment. In such cases, the model generation component 212 may optimize the intermediate topology based upon the input constraints, including automatically remapping the intermediate topology to an optimized network topology by moving functional elements (e.g., nodes or groups of nodes) from a first workload resource domain (e.g., a public cloud) in the intermediate topology, into a different workload resource domain (e.g., a private cloud or on-premise datacenter) in the final formal network topology. In some cases, constraint inputs may specify one or more attributes of a public or private cloud infrastructure.

Although the computing environment 200 may be considered a single computer network, as may each individual workload resource domain 220 within the computing environment 200. As noted above, each of the networks may include a number of network devices configured for intra- and internetwork communications. Such network devices may include any type of networking device, such as servers, switches, routers, hubs, bridges, gateways, modems, repeaters, access points, etc. Additionally, these network devices may include personal, user devices such as phones, tablets, wearables devices, or other personal computing devices. The network devices may comprise physical nodes (e.g., processors, chipsets, devices, etc.), virtual nodes (virtual machines, containers, etc.), and/or any combination thereof.

Individual workload resource domains 220 may, in some cases, correspond to datacenters operating in one or more physical locations. Such datacenters (or other physical locations) may be physical facilities or buildings located across geographic areas that designated to store networked devices that are part of the corresponding workload resource domain 220. These data centers also may include various networking devices, as well as redundant or backup components and infrastructure for power supply, data communications connections, environmental controls, and various security devices. In some examples, a workload resource domain 220 may include one or more virtual data centers which are a pool or collection of cloud infrastructure resources specifically designed for enterprise needs, and/or for cloud-based service provider needs. Generally, the workload resource domains 220 (physical and/or virtual) may provide basic resources such as processor (CPU), memory (RAM), storage (disk), and networking (bandwidth). However, in some examples the network devices of the workload resource domain 220 might not be located in explicitly defined datacenters, but may operate from other physical locations.

The user devices 230 through which the topology deployment system 210 may be controlled, may comprise any type of computing device through which a user is able to interact with other devices (e.g., phones, tablets, personal computing devices, wearable devices, network devices, etc.). In some examples, users of the user devices 230 may have registered accounts with the topology deployment system 210 in order to generate and modify network topology models, and deploy network topologies within the workload resource domains 220. For instance, a topology logical design tool, constraint input tool, and/or optimization or recommendation tools can be provided by the topology deployment system 210 to authorized users at user devices 230 via a client portal (e.g., command line interface (CLI), application programming interface (API), web-based portal, etc.) and/or user interfaces. The user devices 230 may communicate with the topology deployment system 110 (and/or any other devices in the computing environment 200) over one or more networks, including any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As described herein, the topology deployment system 210 may include one or more computing devices (e.g., a single device, multiple devices, network(s) of devices, etc.) comprising one or more processors configured to execute various computer-executable instructions. Additionally, topology deployment system 210 may include components, modules, etc., that are stored on non-transitory computer-readable media and configured to perform the techniques and operations described herein as being performed by the topology deployment system 210. For instance, the topology deployment system 210 may include the model generation component 212, the tenant data analysis component 214, the deployment component 216, and/or any other number or arrangement of components. The components described herein are merely illustrative, and any number or configuration of components may be utilized to perform the techniques described herein.

Figure 3:
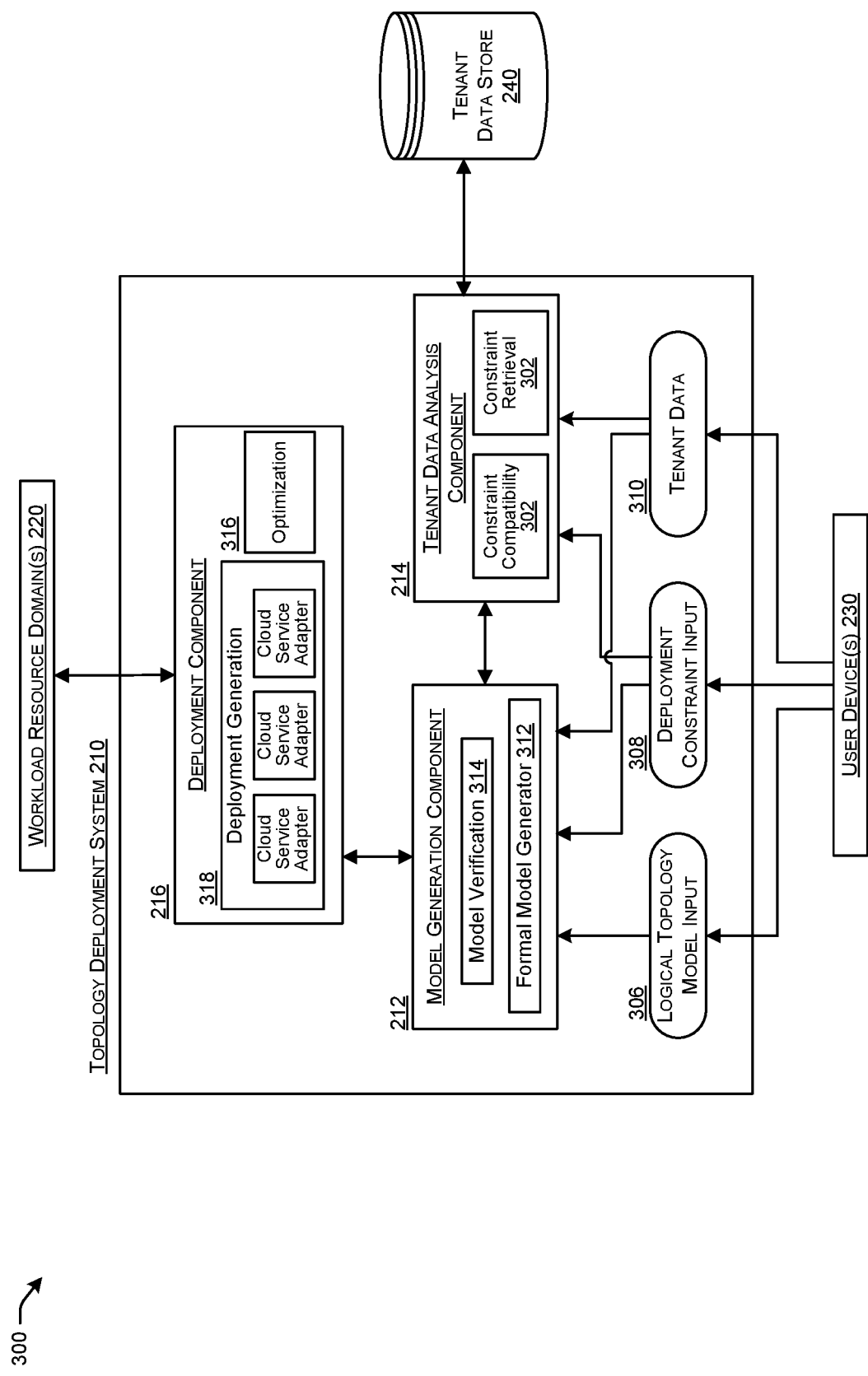
FIG. 3 depicts a system diagram of an example topology deployment system configured to generate and deploy network topologies across multiple workload resource domains based on tenant-specific data and/or deployment constraints.

FIG. 3 depicts a system diagram of an example topology deployment system configured to generate network topology models, verify the compliance of the network topology models with various tenant-specific and/or service-specific deployment constraints and other requirements, and deploy network topologies based on the network topology models in a multi-pool environment. The computing environment 300 in this example may be similar or identical the computing environment 200 discussed above in reference to FIG. 2. Computing environment 300 may include a topology deployment system 210, one or more workload resource domains 220 (e.g., public clouds, private clouds, on-premise datacenters, and/or other resource pools), and a user device 230 through which authorized users (e.g., tenants, administrators, etc.) may provide inputs to and may interact with the tools and features of the topology deployment system 210. Thus, FIG. 3 may illustrate certain embodiments of the computing environment 200 described in FIG. 2, including certain features and techniques performed by the model generation component 212, tenant data analysis component 214, and the deployment component 216.

In some examples, the model generation component 212 may be configured to receive input data and determine network topology models for deployment across workload resource domain(s) 220. When initially determining a network topology model (also referred to as a physical model or formal model) to be deployed, the model generation component 212 may use a logical model initially provided for the network topology, one or more constraint inputs, and resource inventory data for the workload resource domains 220. Within the model generation component 212, a formal model generator 312 may be configured to determine a formal model (e.g., a physical network topology for the deployment network topology across multiple workload resource domains 220). The formal model generator 312 may determine the formal model based on the logical topology model input 306, the deployment constraint input 308, and the tenant data 310 identifying the tenant(s) associated with the request for the deployed network topology.

Constraints 308 (also referred to as deployment constraints) may be predefined deployment conditions, specifications, or limitations that are provided by an administrator user and/or may be based on predefined policies of the network topology. Constraints may be associated with any node or groups of nodes within the deployed network topology, or with the network topology as a whole. Examples of constraints 308 may include requirements for specific nodes to be deployed on specific workload resource domains 220, requirements for groups of nodes to be deployed together on the same workload resource domain 220, requirements for minimum or maximum amounts of compute resources, storage resources, and/or network bandwidth to be provided to nodes or groups of nodes, etc. Additional examples of constraints 308 may include a specified number of virtual machine instances to be instantiated, specific types of software products or software configurations, and/or limits on pricing or cost or minimum amounts of storage, and the like. Still other examples of constraint inputs 308 may include placement of network functions within a workload resource domain 220, sensitivity level of data in a workload resource domain 220, capacity expectation of workload resource domain 220, and data traffic expectations. Additional examples of constraint inputs 308 may include affinity or anti-affinity rules. Other constraint inputs 308 may correspond to security-related constraints, such as requirements for certain applications to have encryption enabled, or authorization to occur between services, or encryption between interconnections of workload resource domains. Additional constraint inputs 308 may correspond to placement of services requirements, which may be based on regulation, SLAs, service cost criteria, etc. Certain constraint inputs 308 also may determine a set of tenants, services, and/or domains that are permitted for interaction with other tenants, services, and/or domains.

As noted above, the constraint inputs 308 may be associated with the request from a user device 230 to generate and deploy a network topology. However, any combination of similar or identical deployment constraints may be defined within the tenant data store 240 for a tenant, a service (or other resource), a workload resource domain, and/or any combination thereof.

In some examples, the model generation component 212 may receive resource inventory data that defines the available resources within each of the workload resource domains 220. The resource inventory data may determine the limits for the potential network topologies spanning the workload resource domains 220 (e.g., multi-cloud deployments, hybrid network deployments, etc.). The particular resource inventory data, including which components collect the resource inventories and provide the data to the topology deployment system 210 may vary in different embodiments. In some instances, a resource inventory may include data specifying which workload resource domains 220 are available, the specific resources that are available within each workload resource domain 220, such as the types of network devices and capabilities, the types of storage devices, the processing units, software services, and/or the types of virtual machine images that are available.

Deployment constraint inputs 308 and/or resource inventory data may be provided by a user (e.g., tenant, service provider, or administrator) via a user device 230, or may be received from other components within the computing environment 300. Additionally or alternatively, constraint inputs 308 and/or resource inventory data may be obtained programmatically from files or configuration data that has been stored within the elements of computing environment 300. For example, network management systems within workload resource domains 220 may store or expose network element inventory data or constraints to API calls, parameterized URLs or other programmatic calls, and the topology deployment system 210 may issue such calls to the tenant data store 240 and/or workload resource domains 220 to obtain responses, objects or download files that contain deployment constraints and/or resource inventory data. In various examples, the model generation component 212 may use one or both of deployment constraints and resource inventory data as inputs, to generate an optimized realization of the network services and other available resources. Constraints and resource inventories may change dynamically based on workload, system/software upgrades, and other factors that may change during the operation of the deployed network topology.

After generating a potential network topology model for deployment, based on the output from the logical topology model input 306 and constraint input 308, and/or resource inventory data, the model generation component 212 may validate and/or optimize the model using the model verification component 314, which also may verify the functional equivalency of the network topology model to the logical topology model input 306. The validated network topology model then may be provided to the deployment component 216, which may use an optimization system 316 and deployment generation system 318 to physically deploy the network topology based on the model, by transmitting sets of deployment instructions to gateways within the workload resource domains 220 to implement the network topology based on the model. In some embodiments, one or more cloud service adaptors may be used to generate specific configuration instructions for the resources in the various workload resource domains 220 (e.g., private clouds, public clouds, and/or on-premise enterprise networks of which the topology deployment system 210 may be a part). The cloud service adaptors may comprise executable code that causes generation of topologies specific to different technologies or services that are available only in specific different workload resource domains 220. Examples include NMS or AWS, where NMS and AWS are two different cloud service providers each providing at least a portion of a public cloud infrastructure in which a network topology may be deployed.

The specific configuration instructions generated by the cloud service adaptors may be provided as input to optimization system 316, which in some embodiments also may receive constraint input 308 as input. In such cases, the configuration instructions may be processed based on the constraint input 308 to remap the network topology to an optimized version that attempts to fulfill as many constraints as possible that are represented in the constraint input 308. The resulting topology may be verified for functional equivalence with the input model represented in logical topology model input 306. In certain embodiments, model verification instructions may be programmed to implement partial order reduction techniques for verification.

During the processes of generating and deploying network topology models, the topology deployment system 210 also use the tenant data analysis component 214 to retrieve and verify compliance with constraints and/or other deployment requirements associated with the tenants, services, and/or domains used for the generated/deployed network topology. In this example a constraint retrieval component 302 may be configured to retrieve deployment constraints (and/or deployment requirements) from the tenant data store 240, and a constraint compatibility component 304 may be configured to verify that all applicable deployment constraints and/or requirements are compatible with the formal model generated by the model generation component 212. Additionally, the constraint compatibility component 304 may compare the In various examples, the model generation component 212 may provide the tenant data analysis component 214 with the tenant identifiers, service (and/or resource) identifiers, and/or domain identifiers selected to be deployed within the workload resource domains 220 for a requested network topology deployment. The tenant data analysis component 214 may use the constraint retrieval component 302 to retrieve the associated constraints, resource inventory data, and/or metadata associated with any of the tenants, services, or domains. In some cases, the constraint compatibility component 304 also may receive the deployment constraint inputs 308 and verify that the deployment constraint inputs 308 are compatible with the deployment constraints and/or other requirements associated with the tenants, services, or domains selected for the deployment. As shown in this example, the tenant data analysis component 214 also may receive tenant data 310 identifying the tenant(s) associated with the request for the network topology generation and deployment. The tenant data analysis component 214 also may retrieve and use the deployment constraints and/or other requirements associated with the requesting (or service consuming) tenants, to verify that the requesting/consuming tenant data 310 is compatible with the deployment constraints and/or other requirements associated with the tenants, services, or domains selected for the deployment.

Figure 4:
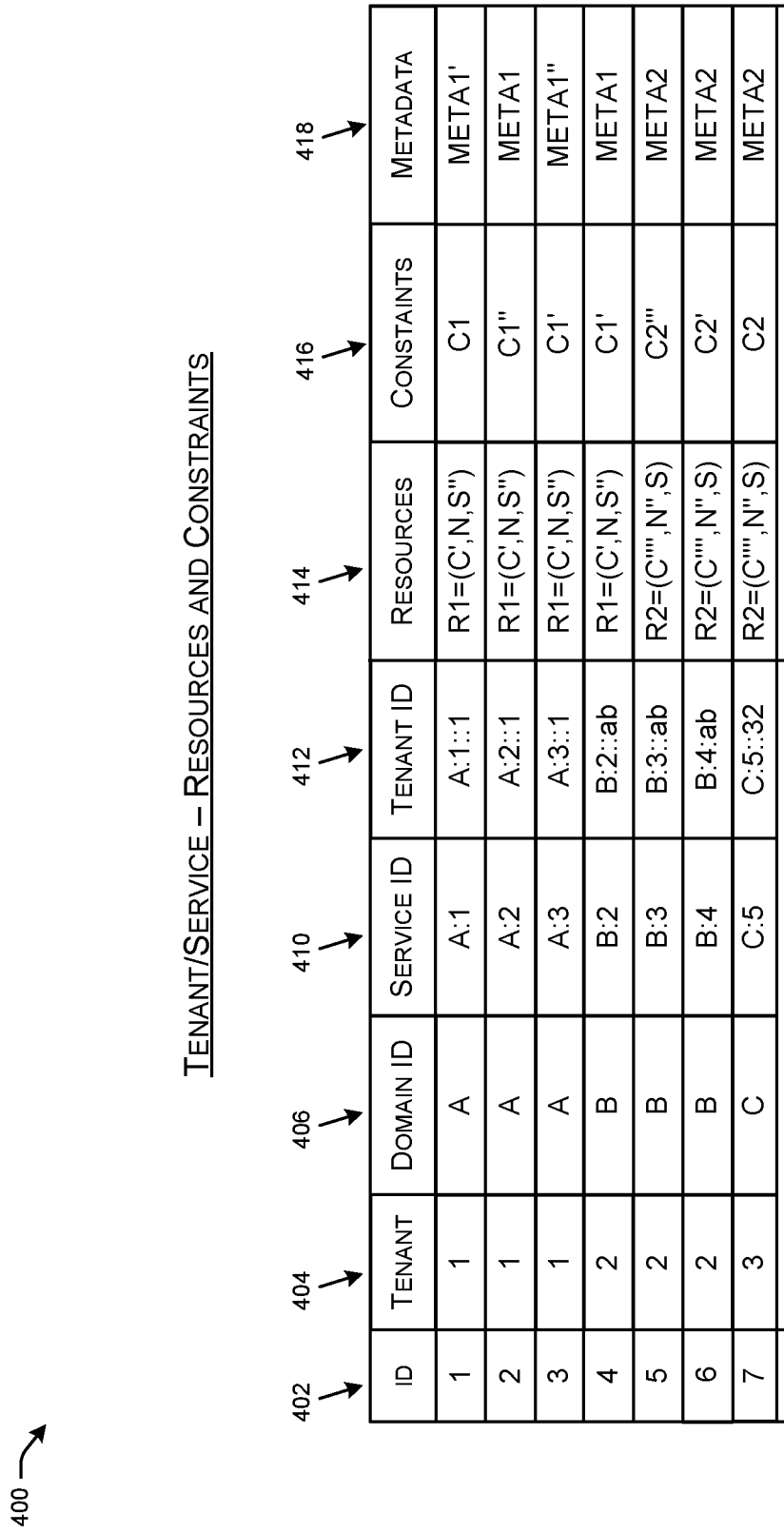
FIG. 4 depicts an example table storing resource and constraint data associated with tenants and/or services in a computing environment.

FIG. 4 is an example table 400 storing resource and constraint data associated with tenants and/or services in a computing environment. In some examples, a tenant data store 240 may include tables or other types of data structures to store resource and constraint data associated with tenants, services/resources, and/or domains, such as the data shown in table 400. As shown in this example, computing resource data, deployment constraint data, and metadata may be stored for each unique combination of a tenant, a domain, and a service. In table 400, column 402 stores identifiers associated with each unique combination of a tenant, domain, and service, column 404 stores tenant identifiers, column 406 stores identifiers associated with workload resource domains, column 408 stores identifiers associated with services (or other deployed resources), column 410 stores identifiers associated with services (or other deployed resources), column 412 stores a tenant identifier, column 414 stores data identifying a set of computing resources (e.g., compute, network, and storage) associated with the tenant/domain/service combination, column 416 stores data identifying a set of deployment constraints associated with the tenant/domain/service combination, and column 418 stores data identifying metadata (e.g., an SLA) associated with the tenant/domain/service combination. Although table 400 provides one example of a technique for storing computing resources, deployment constraints, and metadata associated with tenant/domain/service combination, additional techniques and details of storing and using classification information to identify cloud providers, service identifiers, and tenant identifiers are discussed in U.S. Pat. No. 9,729,406, issued on Aug. 8, 2017, and titled "Cloud Provider, Service, and Tenant Classification in Cloud Computing," which is herein incorporated by reference in its entirety.

Figure 5:
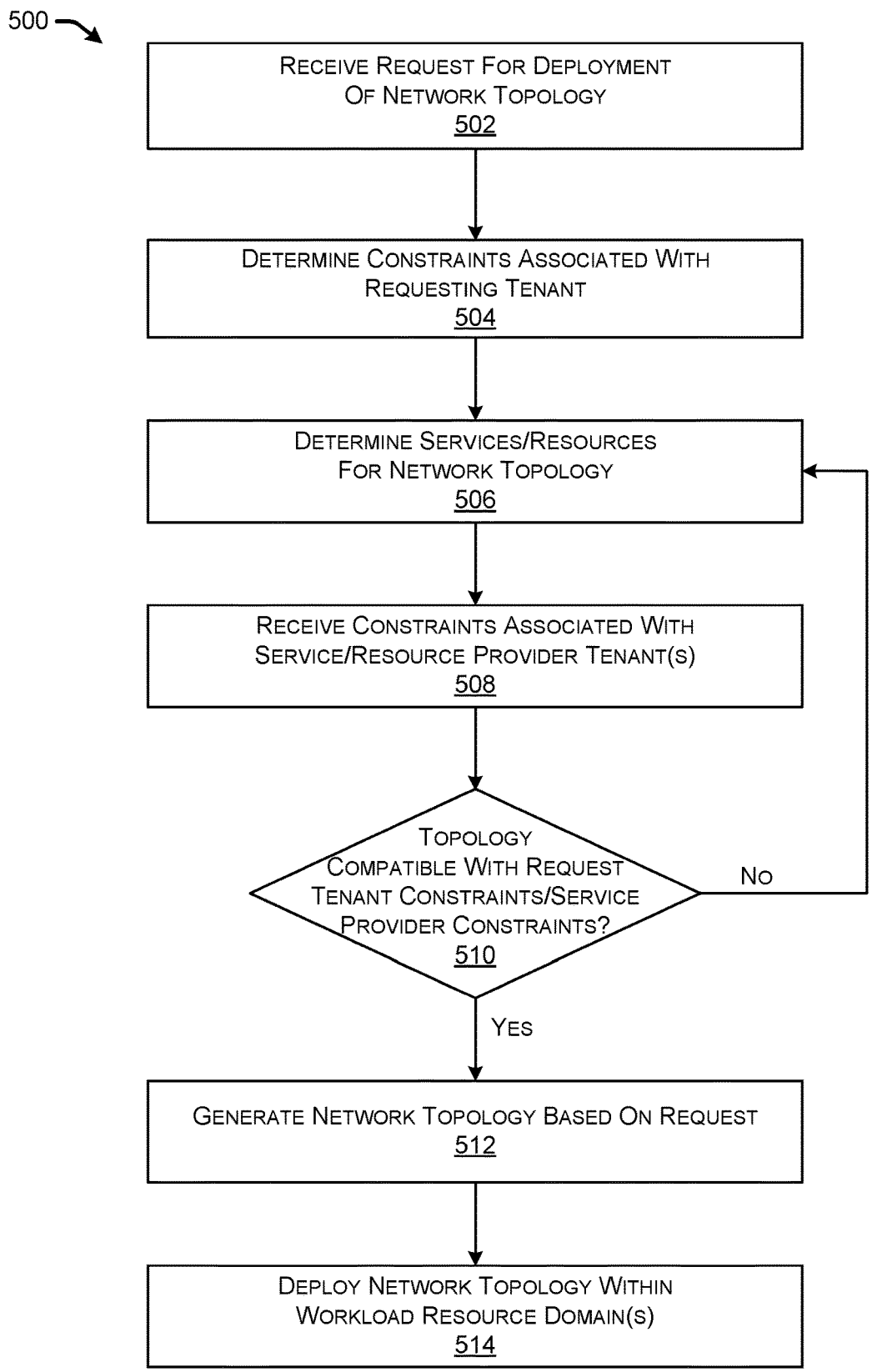
FIG. 5 depicts an example process for generating and deploying a network topology based on deployment constraints associated with tenants in a computing environment.

FIG. 5 is flow diagram depicting an example process 500 for generating and deploying a network topology, based on deployment constraints or other requirements associated with tenant, services, and/or workload resource domains. As described above, a tenant data analysis component 214 may retrieve service-specific and/or tenant-specific deployment constraints and other requirements from a tenant data store 240, and may generated network topology models to verify that the models comply with the various constraints and requirements. In some embodiments, process 500 may be performed by a system including the topology deployment system 210 and/or the tenant data analysis component 214 described herein.

At operation 502, the topology deployment system 210 receives a request to generate and/or deploy a network topology. For example, the model generation component 212 may receive a request from a user device 230, including logical topology model input 306 corresponding to a network topology to be deployed, and constraint input 308.

At operation 504, the topology deployment system 210 determines a set of constraints (and/or other deployment requirements) associated with the requesting tenant. In some examples, the model generation component 212 may provide data identifying the requesting tenant to the tenant data analysis component 214. Additionally or alternatively, the tenant data analysis component 214 may receive tenant data 310 from the user device 230. Based on the tenant data associated with the requesting/consuming tenant, the tenant data analysis component 214 may retrieve deployment constraints, resource inventory data, and/or metadata from the tenant data store 240. Additionally or alternatively, the tenant data analysis component 214 may receive deployment constraints, resource inventory data, and/or metadata from the user device 230.

At operation 506, the topology deployment system 210 determines a set of services and/or resources for the network topology to be deployed. As described above, the model generation component 212 may use a formal model generator 312 to determine a formal model (e.g., a physical network topology for the deployment network topology across multiple workload resource domains 220) that is functionally equivalent to the logical model, using resources (e.g., services) provided by multiple different service providers (e.g., tenants) within the cloud computing environment.

At operation 508, the topology deployment system 210 determines one or more sets of constraints (and/or other deployment requirements) associated with the tenants providing the services/resources in the network topology determined in operation 506. Operation 508 may include similar or identical techniques to those described above in operation 504, in which the tenant data analysis component 214 may retrieve deployment constraints, resource inventory data, and/or metadata from the tenant data store 240. However, in operation 508 the constraint and/or deployment requirement data is retrieved for the tenants, services, and/or workload resource domains determined by the model generation component 212 for the network topology deployment.

At operation 510, the topology deployment system 210 determines whether or not the constraints and/or other deployment requirements associated with the tenant/service requesting the network topology deployment (from operation 504), and those associated with the tenants providing the services/resources (from operation 508), comply with the formal network topology model determined in operation 506. When the particular network topology determined in operation 506, including the resources/services, tenants, and domains, can be deployed in compliance with the constraints and/or other deployment requirements determined in operations 504 and 508 (510:Yes), then in operation 512 the topology deployment system 210 generates the determined network topology, and at operation 514 the topology deployment system 210 deploys the network topology within the one or more of the workload resource domains 220. The deployment component 216 may perform the physical deployment of the formal model using the techniques described above. In various examples, the deployment performed at operation 514 may be a deployment of a new formal model, or may be a modification of an existing deployed model.

In contrast, when the topology deployment system 210 determines that the constraints and/or other deployment requirements determined in operations 504 and 508 are not compatible with the network topology model determined in operation 506 (510:No), then process 500 returns to operation 506 to determine an updated network topology. In some examples, the tenant data analysis component 214 may transmit data back to the model generation component 212 indicating which tenants (or tenant/service/cloud combinations) have constraints or requirements that are not compatible with the network topology model. In such examples, the model generation component 212 may use the data to modify the model by determining alternative tenants, services, and/or domains to be used instead of the tenants, services, and/or domains having incompatible constraints/requirements.

Figure 6:
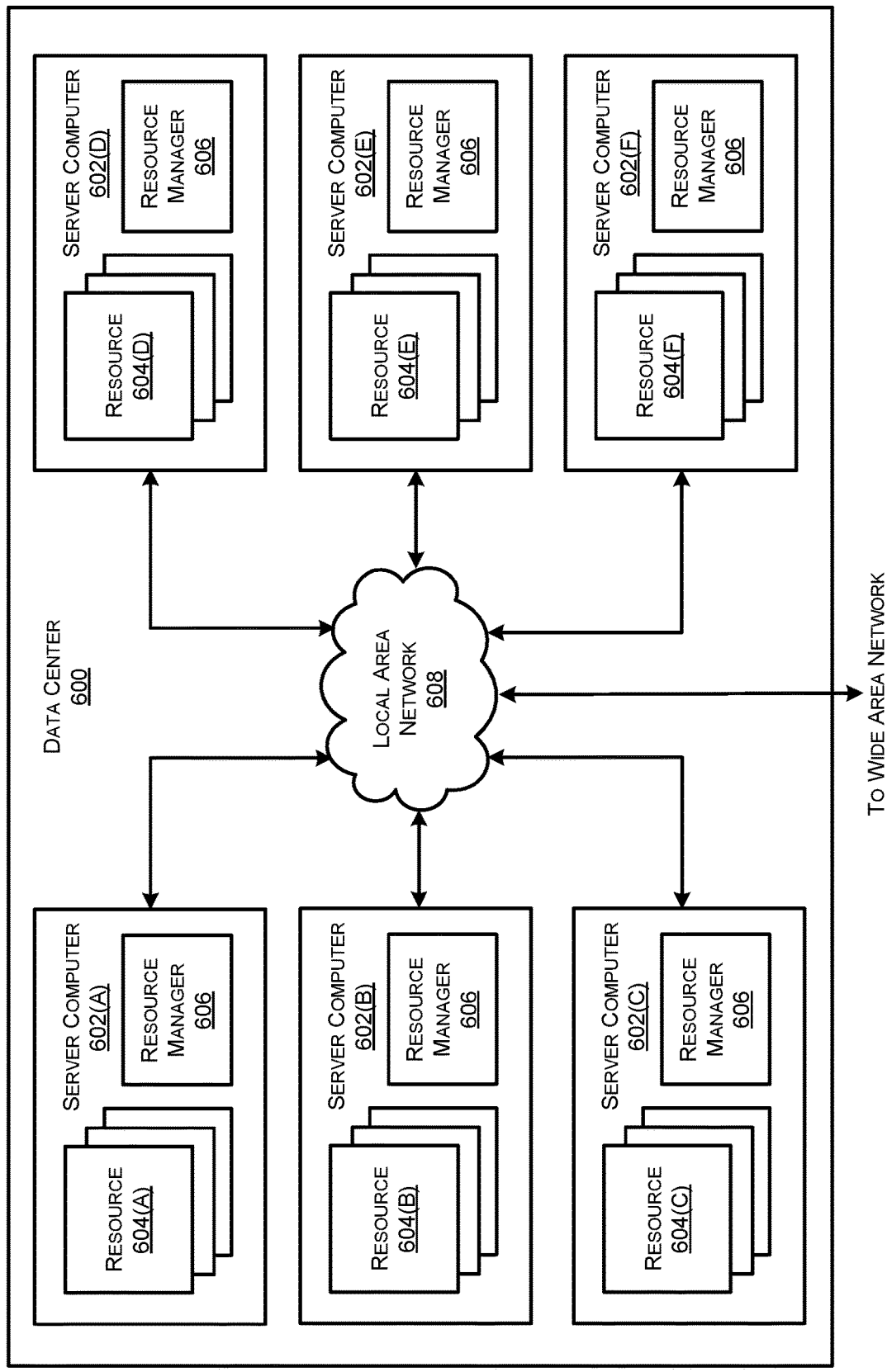
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, any of the computing devices, systems, or components described herein. For examples, a workload resource domain 220 may be implemented using one or more of a data center 600. Additionally or alternatively, a server computer 602 may correspond any or all of the components of the topology deployment system 210 described herein (e.g., the model generation component 212, tenant data analysis component 214, and/or deployment component 216), and/or any other computing devices included in the computing environment 200. Although described as server computers, the server computers 602 may comprise any type of networked device, such as servers, switches, routers, hubs, bridges, gateways, modems, repeaters, access points, etc.

The server computers 602 can be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized. In some examples, the server computers 602 may each execute one or more application containers and/or virtual machines to perform techniques described herein.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 800 are facilities utilized to house and operate computer systems and associated components. The data centers 600 typically include redundant and backup power, communications, cooling, and security systems. The data centers 600 can also be located in geographically disparate locations.

Figure 7:
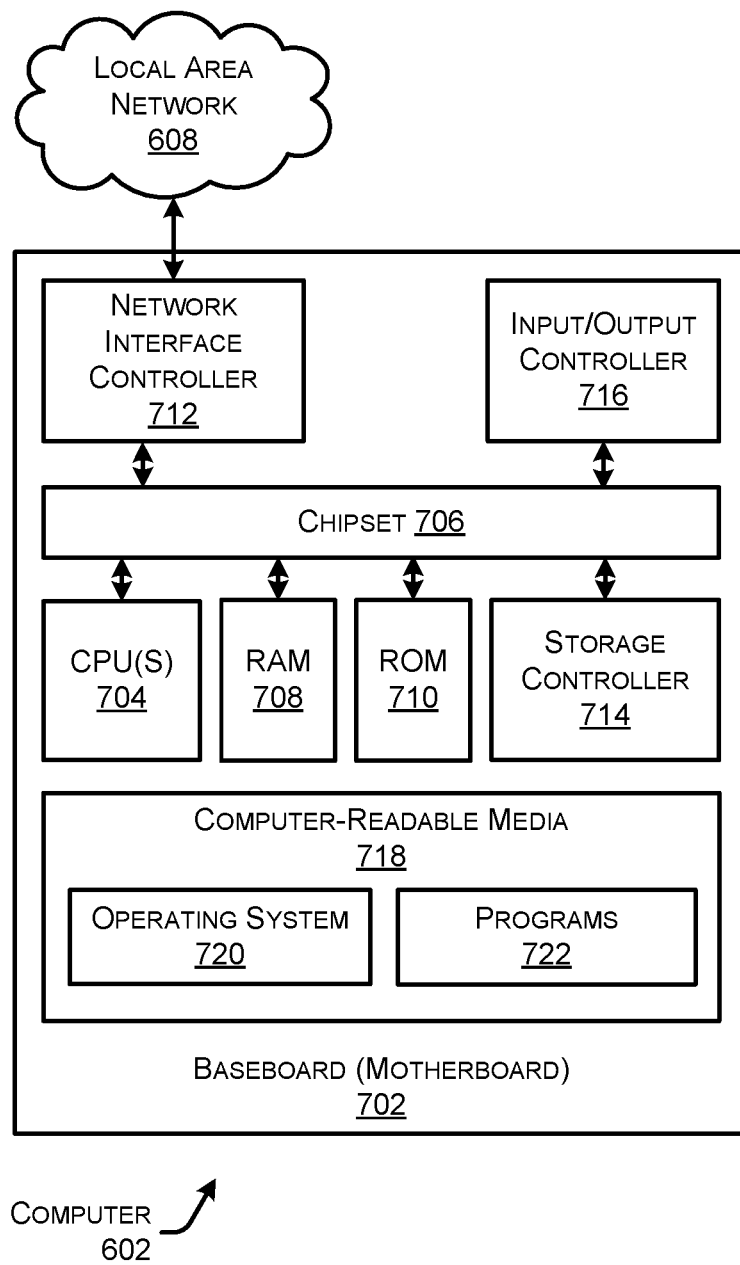
FIG. 7 is a computer architecture diagram showing an illustrative computer hardware architecture for implementing a server device that can be utilized to implement aspects of the various technologies presented herein.

FIG. 7 shows an example computer architecture for a server computer 602 capable of executing program components for implementing the functionality described above. The computer architecture shown in FIG. 7 may correspond to a conventional server computer, workstation, desktop computer, laptop, tablet, network appliance, e-reader, smartphone, or other computing device, and can be utilized to execute any of the software components presented herein. In some examples, a server computer 602 may be used to implement the topology deployment system 210 and/or any of the separate computing devices, systems, or components of the topology deployment system 210 described herein (e.g., the model generation component 212, tenant data analysis component 214, and/or deployment component 216), and/or may be used to implement user device(s) 230. Although not shown in this example, the server computer 602 may comprise network devices such as servers, switches, routers, hubs, bridges, gateways, modems, repeaters, access points, etc.

The server computer 602 may correspond to any of the computing devices, systems, or components of the topology deployment system 210 described herein. In some examples, the server computer 602 may be configured to perform, potentially in conjunction with other server computers, some or all of the operations of the topology deployment system 110.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computer 602 to other computing devices over the network 608. It should be appreciated that multiple NICs 712 can be present in the computer 802, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602.

In some examples, the operations performed by the topology deployment system 210 and/or any components included therein, may be supported by one or more devices similar to computer 602. Stated otherwise, some or all of the operations performed by the topology deployment system 210 and or any components included therein, may be performed by one or more computer devices 602 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above in reference to FIGS. 1-5. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture different than that shown in FIG. 7.

As described herein, the computer 602 may comprise any of the devices described herein. The computer 602 may include one or more hardware processors 704 (processors) configured to execute one or more stored instructions. The processor(s) 704 may comprise one or more cores. Further, the computer 602 may include one or more network interfaces configured to provide communications between the computer 602 and other devices, such as the communications described herein as being performed by the topology deployment system 210, the user device(s) 230, and/or the workload resource domain(s) 220. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure performed by the topology deployment system 210, the user device(s) 230, and/or the workload resource domain (s) 220. For instance, the programs 722 may cause the computer 602 to perform techniques for generating and deploying network topologies within one or more workload resource domain(s) 220.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing computer-executable instructions that, when executed by the one or more processors, perform operations comprising:
      receiving a logical topology model;
      determining, based at least in part on the logical topology model, a first cloud service operating in a cloud computing environment;
      determining a first service provider tenant associated with the first cloud service, the first service provider tenant including one or more computer systems configured to provide the first cloud service via the cloud computing environment;
   determining a first tenant-specific deployment constraint associated with the first service provider tenant, wherein the first tenant-specific deployment constraint includes at least one service execution requirement for the first cloud service;
   determining, based at least in part on the logical topology model, a second cloud service operating in the cloud computing environment;
   determining a second service provider tenant associated with the second cloud service, the second service provider tenant including one or more additional computer systems configured to provide the second cloud service via the cloud computing environment;
   determining a second tenant-specific deployment constraint associated with the second service provider tenant, wherein the second tenant-specific deployment constraint includes at least one additional service execution requirement for the second cloud service; and determining a network topology for the cloud computing environment based on the logical topology model, wherein the network topology includes the first cloud service the second cloud service, and wherein determining the network topology comprises verifying that the network topology complies with the first tenant-specific deployment constraint and the second tenant-specific deployment constraint.

2. The system of claim 1, wherein the first cloud service comprises at least one of a web service, an application service, or a database service.

3. The system of claim 2, wherein determining the network topology comprises:
  combining a first subset of tenant-specific deployment constraints associated with the first service provider tenant, with a second subset of tenant-specific deployment constraints associated with the second service provider tenant.

4. The system of claim 1, wherein determining the network topology comprises:
  receiving a request to generate a deployment of the network topology within the cloud computing environment, wherein the request is associated with third cloud service provided by a third service consumer tenant associated with the cloud computing environment, the third service provider tenant including one or more additional computer systems configured to consume the first cloud service and the second cloud service and provide the third cloud service as a composite service via the cloud computing environment;
  determining a third tenant-specific deployment constraint associated with the third service consumer tenant; and
  verifying that the network topology complies with the third tenant-specific deployment constraint associated with the third service consumer tenant.

5. The system of claim 1, the operations further comprising:
  determining a set of deployment instructions based on the network topology; and
  transmitting the set of deployment instructions to one or more nodes within the cloud computing environment.

6. The system of claim 1, wherein the cloud computing environment comprises a plurality of workload resource domains, and wherein the network topology comprises at least one cloud service operating in each of the plurality of workload resource domains.

7. The system of claim 1, wherein:
  the first service provider tenant is associated with a first set of cloud services including the first cloud service, and a first set of tenant-specific deployment constraints including the first tenant-specific deployment constraint;
  the second service provider tenant is associated with a second set of cloud services including the second cloud service, and a second set of tenant-specific deployment constraints including the second tenant-specific deployment constraint; and
  the first set of cloud services is different from the second set of cloud services, and the first set of tenant-specific deployment constraints is different from the second set of tenant-specific deployment constraints.

8. A method comprising:
  receiving, by a topology deployment system, a logical topology model;
  determining, based at least in part on the logical topology model, a first cloud service operating in a cloud computing environment;
  determining a first service provider tenant associated with the first cloud service, including on or more computer systems configured to provide the first cloud service to the cloud computing environment;
  determining, by the topology deployment system, first tenant-specific deployment constraint associated with the first service provider tenant, wherein the first tenant-specific deployment constraint includes at least one service execution requirement for the first cloud service;
  determining, based at least in part on the logical topology model, a second cloud service operating in the cloud computing environment;
  determining a second service provider tenant associated with the second cloud service, including on or more additional computer systems configured to provide the second cloud service to the cloud computing environment;
  determining, by the topology deployment system, a second tenant-specific deployment constraint associated with the second service provider tenant, wherein the second tenant-specific deployment constraint includes at least one additional service execution requirement for the second cloud service; and
  determining, by the topology deployment system, a network topology for the cloud computing environment based on the logical topology model, wherein the network topology includes the first cloud service and the second cloud service, and wherein determining the network topology comprises selecting, as the network topology, a network topology that complies with the first tenant-specific deployment constraint and the second tenant-specific deployment constraint.

9. The method of claim 8, wherein the first cloud service comprises at least one of a web service, an application service, or a database service.

10. The method of claim 9, wherein determining the network topology comprises:
  combining a first subset of tenant-specific deployment constraints associated with the first service provider tenant, with a second subset of tenant-specific deployment constraints associated with the second service provider tenant.

11. The method of claim 8, wherein determining the network topology comprises:
  receiving a request to generate a deployment of the network topology within the cloud computing environment, wherein the request is associated with a third cloud service provided by a third service consumer tenant associated with the cloud computing environment, the third service provider tenant including one or more additional computer provide the third cloud service as a composite service via the cloud computing environment;
  determining a third tenant-specific deployment constraint associated with the third service consumer tenant; and
  verifying that the network topology complies with the third tenant-specific deployment constraint associated with the third service consumer tenant.

12. The method of claim 8, further comprising:
  determining a set of deployment instructions based on the network topology; and
  transmitting the set of deployment instructions to one or more nodes within the cloud computing environment.

13. The method of claim 8, wherein the cloud services environment comprises a plurality of workload resource domains, and wherein the network topology comprises at least one cloud service operating in each of the plurality of workload resource domains.

14. The method of claim 8, wherein:
the first service provider tenant is associated with a first set of cloud service including the first cloud service, and a first set of tenant-specific deployment constraints including the first tenant-specific deployment constraint;
the second service provider tenant is associated with a second set of cloud services including the second cloud service, and a second set of tenant-specific deployment constraints including the second tenant-specific deployment constraint; and
the first set of cloud services is different from the second set of cloud services, the first set of tenant-specific deployment constraints is different from the second set of tenant-specific deployment constraints.

15. The method of claim 8, wherein each of the first tenant-specific deployment constraint and the second tenant-specific deployment constraint include at least one of:
a constraint associating a service with a particular workload resource domain in the cloud computing environment;
a constraint identifying an amount of at least one of a compute resource, a storage resource, or a network resource associated with a service;
a security-related constraint; or
a constraint including an affinity rule or an anti-affinity rule.

16. The method of claim 8, wherein determining the network topology for the cloud computing environment comprises:
determining a first proposed network topology including the first cloud service and the second cloud service;
determining that the first proposed network topology fails to comply with at least one of the first tenant-specific deployment constraint or the second tenant-specific deployment constraint; and
modifying the first proposed network topology, in response to determining that the first proposed network topology fails to comply with at least one of the first tenant-specific deployment constraint or the second tenant-specific deployment constraint.

17. A non-transitory computer-readable medium storing processor-executable instructions that, when executed by one or more processors, cause the one or more processors to perform operations comprising:
receiving a logical topology model;
determining, based at least in part on the logical topology model, a first cloud service operating in a cloud computing environment;
determining a first service provider tenant associated with the first cloud service, including one or more computer systems configured to provide the first cloud service to the cloud computing environment;
determining a first tenant-specific deployment constraint associated with the first service provider tenant, wherein the first tenant-specific deployment constraint includes at least one service execution requirement for the first cloud service;
determining, based at least in part on the logical topology model, a second cloud service operating in the cloud computing environment;
determining a second service provider tenant associated with the second cloud service, including one or more additional computer systems configured to provide the second cloud service to the cloud computing environment;
determining a second tenant-specific deployment constraint associated with the second service provider tenant, wherein the second tenant-specific deployment constraint includes at least one additional service execution requirement for the second cloud service; and
determining a network topology for the cloud computing environment based on the logical topology model, wherein the network topology includes the first cloud service and the second cloud service, and wherein determining the network topology comprises selecting, as the network topology, a network topology that complies with the first tenant-specific deployment constraint and the second tenant-specific deployment constraint.

18. The non-transitory computer-readable medium of claim 17, wherein the first cloud service comprises at least one of a web service, an application service, or a database service.

19. The non-transitory computer-readable medium of claim 18, wherein determining the network topology comprises:
combining a first subset of tenant-specific deployment constraints associated with the first service provider tenant, with a second subset of tenant-specific deployment constraints associated with the second service provider.

20. The non-transitory computer-readable medium of claim 17, wherein determining the network topology comprises:
receiving a request to generate a deployment of the network topology within the cloud computing environment, wherein the request is associated with a third cloud service provided by a third service consumer tenant associated with the cloud computing environment, the third service provider tenant including one or more additional computer systems configured to consume the first cloud service and the second cloud service and the second cloud service and provide the third cloud service as a composite service via the cloud computing environment;
determining a third tenant-specific deployment constraint associated with the third service consumer tenant; and
verifying that the network topology complies with the third tenant-specific deployment constraint associated with the third service consumer tenant.

* * * * *